June 4, 1968  R. SCHEUFLER  3,386,783
ANTI-FRICTION BEARING

Filed May 3, 1965  6 Sheets-Sheet 1

Inventor:
ROLAND SCHEUFLER
By Burgess, Dinklage & Sprung
ATTORNEYS

June 4, 1968  R. SCHEUFLER  3,386,783
ANTI-FRICTION BEARING
Filed May 3, 1965  6 Sheets-Sheet 2

Inventor:
ROLAND SCHEUFLER
By Burgess, Dinklage & Sprung
ATTORNEYS

Inventor:
ROLAND SCHEUFLER
BY Burgess, Dinklage + Sprung
ATTORNEYS

June 4, 1968   R. SCHEUFLER   3,386,783
ANTI-FRICTION BEARING
Filed May 3, 1965   6 Sheets-Sheet 5

Inventor:
ROLAND SCHEUFLER
BY Burgess, Dinklage & Sprung
ATTORNEYS

June 4, 1968   R. SCHEUFLER   3,386,783
ANTI-FRICTION BEARING

Filed May 3, 1965   6 Sheets-Sheet 6

Inventor:
ROLAND SCHEUFLER
By Burgess, Dinklage & Sprung
ATTORNEYS

United States Patent Office 3,386,783
Patented June 4, 1968

3,386,783
ANTI-FRICTION BEARING
Roland Scheufler, Neckarsulm, Germany, assignor to Karl Schmidt, G.m.b.H., Neckarsulm, Germany, a corporation of Germany
Filed May 3, 1965, Ser. No. 453,243
Claims priority, application Germany, May 2, 1964, Sch 35,088
10 Claims. (Cl. 308—121)

ABSTRACT OF THE DISCLOSURE

This specification discloses an anti-friction bearing having two shell halves with comb-like grooves disposed in each half at the intersection between the bearing face and the meeting face between the two bearing halves. In one preferred embodiment disclosed, the comb-like grooves pass completely through the bearing half from the bearing surface to the inside. In another preferred embodiment, the line of intersection between the meeting face and the bearing face referred to above, which constitutes one of the high points in the bearing shell between the above-referred-to grooves, is chamfered along the interior portion thereof with the front and rear ends being permitted to retain their full height so as to maintain oil in the system. In a most preferred embodiment disclosed, this referred to chamfer has an increasing or decreasing depth as it proceeds outward from the center of the bearing shell to the front and rear ends thereof.

---

This invention relates in general to anti-friction bearings, and more particularly to an anti-friction bearing construction wherein an element which is adapted for movement relative to a bearing surface and journally supported thereby is supplied with a lubricant film by a system of lubricant flow passages to reduce the friction opposing the movement of the journalled element relative to the bearing surface.

It has been found in accordance with the invention, that by providing means defining a plurality of flow paths communicating with the bearing surface for distributing a lubricant thereover to form a lubricant film to accommodate the movement of the journalled element, a favorable lubricant film distribution can be realized, as well as other advantages including a reduced loss of lubricant of the bearing, and the elimination of air from the bearing and the cavitation damage resulting therefrom.

The anti-friction bearing construction of the invention utilizes grooves and/or pockets recessed into the bearing surface for distributing the lubricant and aiding in the formation of a stable supporting lubricant film. In addition, such recessed grooves and/or pockets can also be provided in the bearing contact surface of the journalled element as well.

While in general anti-friction bearing lubrication systems have been known in the machinery and engine design art, such prior art lubricated bearings are subject to various disadvantages, such as excessive lubricant oil loss, and lubricant film cavitation caused by air penetration.

In the bearing construction of the invention, the grooves serve for the circulation of the coolant lubricant, and also to facilitate the removal of contaminants from the bearing, and particularly to form a hydro-dynamic lubrication gap between the bearing surface and journal contact surface and provide for a favorable distribution of the lubricant over the bearing surface. These grooves and pockets, when appropriately designed and disposed in accordance with the invention, aid the flow processes which build up the lubricant film in the bearing during the rotation of the journalled element. The shape and arrangement of such grooves and pockets is of great importance to the life and proper functioning of the bearing.

On the basis of experience in the prior art, care has always been taken to locate the grooves not too close to the margin of the bearing, so as to prevent an excessive flow of oil out of the bearing.

To achieve a highly precise guidance of the journalled element and a noiseless bearing operation, anti-friction bearings have been used having ovalized internal bores. The clearance gaps in the unloaded zones of such ovalized bearings are approximately the same magnitude as those in bearings of circular crossection thereby rendering such prior art ovalized bearings subject to the disadvantage that lubricant oil can easily escape from the bearings at these points, so that air can penetrate into the interior of the bearing. Particularly in the case of split bearings having parting surfaces which have been ground to remove metal flashes in the course of their manufacture, passages are thereby formed through which, oil can escape from the bearing.

On account of this advantage, it is usually impossible to assure a reliable supply of oil to the crank pins, for example, in the case of the bearings on the crank shaft of an internal combustion engine. This results in very rapid wear of the crank pin and at the crank pin bearing. It is therefore necessary to improve the performance of the connecting rod bearings under severe operating conditions by the application of galvanic coatings to the bearing material.

On account of the poor supply of lubricant oil to such connecting rod bearings, a considerable penetration of air into the interior of the bearing results. This penetration of air into the bearing leads to air bubble formation in the lubricating film and occasionally to cavitation damage in the bearing, both to the journal and to the bearing. The air bubbles in the oil film act like suction cups when the journalled pin is lifted from the surface of the bearing, and thus destroy said bearing surface. Such damage occurs frequently in the case of connecting rod bearings, since the oscillating movement of the connecting rod abruptly pulls the bearing surfaces away from the journalled shaft surface, especially in the unloaded area of the bearing. The result of this is a chipping out of pieces from the bearing material.

Attempts have been made to prevent the aforementioned air bubble formation by the additional injection of lubricant by means of a second oil pump operating under very high pressure. While this measure assures reliable bearing operation, it also involves relatively high operating costs, and furthermore its application is limited to cases where sufficient space is available to accommodate such oil pumping equipment.

Within the framework of the instant invention, it has been discovered that it is extremely advantageous to the solution of such bearing lubrication problems to arrange over the entire width of the bearing surface, a plurality of grooves and/or pockets for supplying and distributing the lubricant, and that satisfactory lubrication performance can be achieved by making such grooves and pockets relatively uniform in depth, and by arranging them in a comb-like arrangement. Such a comb-like arrangement of the grooves in accordance with the invention assures that the path of the lubricant working toward the margins of the bearing is lengthened, and thus the passage of the lubricant out of the bearing is delayed, and in most cases is substantially prevented.

The lubricating oil naturally tends to follow the path of least resistance, i.e. to pass out of the bearing in the areas of the greatest clearance gaps. If these bearing surface areas are interrupted according to the invention by a plurality of grooves and/or pockets, this rate of outward movement of the lubricant is delayed to such an extent that the lubricant is carried by the moving journalled element, such as for example a rotating shaft, into the more highly loaded bearing areas before said lubricant can depart from the bearing. In this manner, the lubricated bearing of the invention is effective to prevent premature lubricant loss.

In certain applications, it is advantageous to arrange the grooves and/or the pockets in the more highly loaded bearing surface areas, with the shape and dimensions of said grooves being adapted to the particular lubricating requirements in each case.

Furthermore, in the case of certain embodiments of the invention utilizing circumferentially disposed lubricant groove arrangements which are interconnected by an axially disposed groove, the lubricant that runs too quickly into the outer marginal area of the bearing can be carried in such an axial groove back to the central portion of the bearing, while the outer circumferential grooves disposed adjacent to the bearing margins can be supplied with lubricant through this axial connecting groove. In most cases, it is preferable to locate such axial grooves in the lower pressure areas of the bearing surface.

Due to the cooling action on the bearing parts provided by the lubricant distribution in the bearing construction according to the invention, cavitation damage to the bearing is also prevented since the lubricant filled grooves and pockets have a sealing action whereby the penetration of air into the interior of the bearing is substantially eliminated. Experience has shown that the penetration of air is greatly favored by the suction effect produced in the low pressure area of the bearing. Accordingly, the invention provides for an effective seal precisely in such low pressure areas of the bearing by locating the grooves and/or pockets in such areas.

The invention furthermore provides for a direct connection between the grooves and the oil pump used to supply lubricating oil to said grooves.

In addition, such grooves can be provided on both the bearing surface and on the journal element bearing contact surface as well, and can also be provided in accordance with the invention, in the bearing surfaces of axial thrust bearings.

The anti-friction bearing of the instant invention can be used for supporting various types of journalled elements such as shafts, connecting pins, etc., and in general, any commonly used journalled element which moves in relation to the bearing surface along a given path.

Essentially, the bearing of the invention comprises a shell wall having a surface disposed in adjacent parallel relation to the movable journalled element to be supported, with said surface being also disposed in parallel relation to the path of movement of said journalled element. For example, in the case of an anti-friction bearing for supporting a circular journalled shaft, this surface, which is actually the bearing surface, would be on the interior of the shell wall and disposed in adjacent surround relation to the shaft. The shell wall is provided with a plurality of recessed grooves which are open at the bearing surface to distribute a lubricant thereover to form a lubricant film disposed between the bearing surface and the contact surface of the movable journalled element so as to support said element in relation to the bearing surface and to reduce the friction opposing the movement of the journalled element relative to the bearing surface.

The lubricant is supplied to these grooves by means such as flow passages disposed through the bearing shell wall and operatively connected to a lubricant source to supply lubricant to the grooves, either directly to all grooves, or to one groove and thence to the other grooves via interconnecting flow passages.

In general, these grooves are disposed lengthwise, either entirely or partially, in parallel relation to the path of relative movement between the bearing surface and the journalled element.

It has been found advantageous to arrange the grooves and/or pockets in the bearing surface in parallel spaced-apart relation to each other and aligned parallel to the direction of relative movement.

For example, in the case of a circular cross-section journal shaft, in a circular, or approximately circular bearing shell surface, the path of relative movement would be defined by the intersection of a plane normal to the shaft rotation axis and the cylindrical bearing surface. Thus, the lubricant grooves would run circumferentially, but not necessarily completely, around the bearing surface, and can be located parallel to one another at spaced-apart axial stations on said bearing surface.

It is therefore, an object of the invention to provide an anti-friction bearing having flow path means for producing a lubricant film over its bearing surface.

Another object of the invention is to provide an anti-friction bearing as aforesaid with improved lubricant distribution properties, so as to assure a continuous lubricant film on its bearing surface.

A further object of the invention is to provide an anti-friction bearing as aforesaid which has improved lubricant sealing properties to prevent premature loss of lubricant from the bearing, and to assure the presence of sufficient lubricant within the bearing for proper film formation.

A further object of the invention is to provide an anti-friction bearing as aforesaid which substantially precludes the penetration of air into its interior portions.

Still another object of the invention is to provide an anti-friction bearing as aforesaid which is relatively immune from lubricant cavitation under operating conditions.

Other and further objects and advantages of the invention will become apparent from the following detailed description and accompanying drawings in which.

Figure 31:
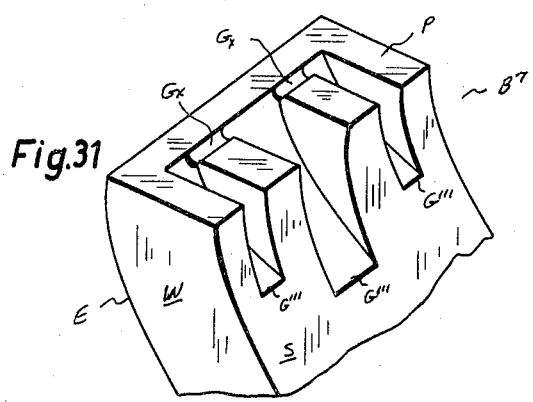
FIG. 31 is a perspective view of a portion of a bearing shell segment for a bearing which supports a rotatable journal shaft, showing a lubricant arrangement wherein the lubricant grooves are flow connected by a passage recessed into the parting surface of the shell segment according to another embodiment of the invention.
Figure 32:
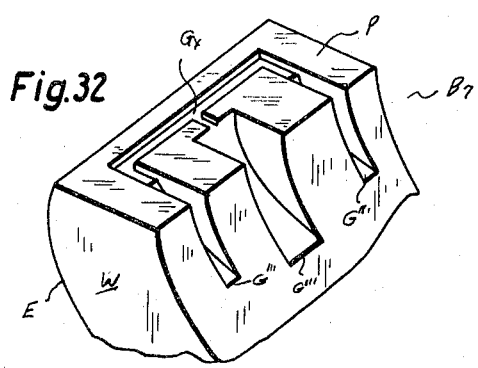
FIG. 32 is a perspective view of another bearing shell segment similar to that shown in FIG. 31, showing a different passage arrangement for flow connecting the lubricant grooves.
Figure 33:
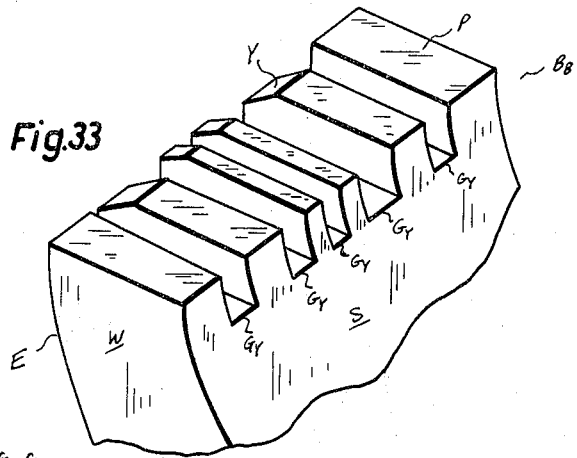

FIG. 33 is a perspective view of another bearing shell segment similar to those shown in FIGS. 31 and 32, but wherein the lubricant grooves extend completely through the bearing shell and are flow connected by a passage on the exterior surface of the shell which is formed by chamfering the land corners between adjacent grooves at the parting surface intersection with the exterior surface of the shell.

Figure 34:
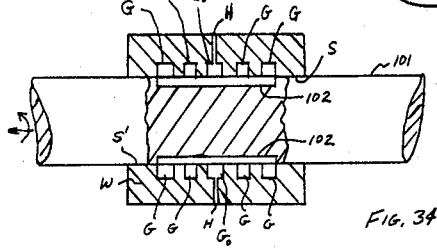

FIG. 34 is a longitudinal sectional view of a bearing and rotatable shaft journalled thereto in which the bearing surface is provided with lubricant grooves and in which the journal shaft is also provided with recessed grooves which cooperate with the grooves in the bearing to distribute the lubricant over the bearing surface, in accordance with a further embodiment of the invention.

Figure 1:
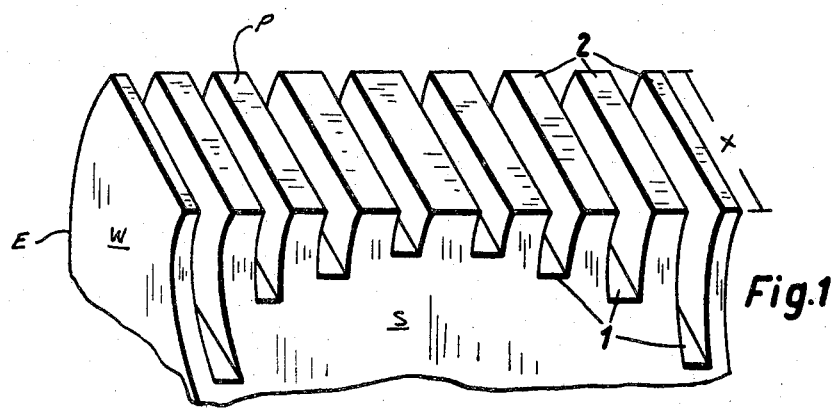
FIG. 1 is a perspective view of a portion of a bearing shell segment of a split bearing according to a preferred embodiment of the invention.

Briefly referring to the figures of the drawings, FIG. 1 represents a section of the unloaded area of a bearing shell W of a split bearing, in which the grooves 1 in accordance with the invention, are created in a comb-like arrangement. Their depth increases towards the margin of the bearing. Furthermore, the grooves 1 in FIG. 1 pass through the entire bearing wall thickness X, so that lands 2 remain between them.

Figure 26:
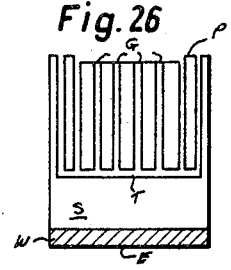
FIG. 26 is a side view, partly in section, of a bearing shell segment similar to that shown in FIG. 23, and illustrating still another and further lubricant groove arrangement according to the invention.

With a proper radial length of the lands 2, they can be advantageous both to the operation of the bearing and to the installation and application thereof. For example, in the case of bearing components of different materials or different coefficients of thermal expansion, these lands 2 can be constructed so as to bridge the different expansions of the bearing components, i.e. the lands can be constructed so as to be deformable under the influence of heat produced in the operation of the bearing, in a direction of deformation which results in a reduction of the bearing surface S bore. With such a bearing bore reduction, it is possible not only to prevent an excessively heavy or rapid escape of the lubricating oil and the entrapment of air, but also to prevent thermal upsetting or permanent deformations, both in the bearing and its associated bearing block. The elasticity of the lands 2 can be simply increased by reducing their cross section, or an opening can be made in the lands 2 in the central area of the bearing, as represented in FIG. 26.

Figure 2:
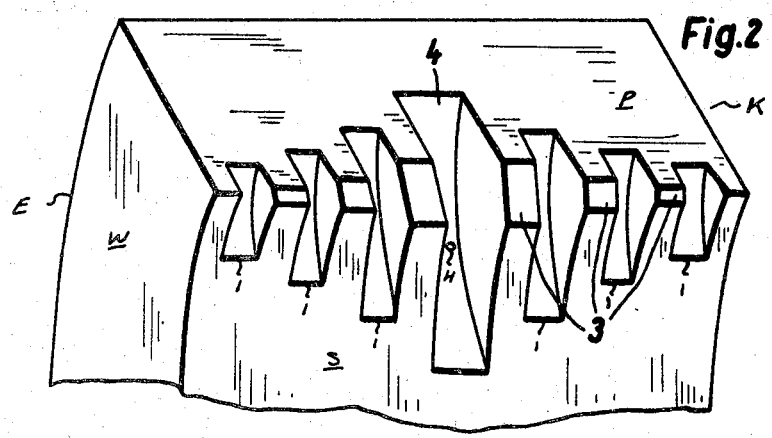
FIG. 2 is a perspective view of a portion of a bearing shell segment of a split bearing according to another embodiment of the invention.

With reference to FIG. 2, the invention undertakes, especially for the cold starting of an internal combustion engine, to provide the individual lands between the grooves with chambers 3 of varying size. In this manner it is possible according to the invention to produce an additional favorable influence, as far as bearing operation is concerned, on the flow of the lubricating oil which is first pumped into the middle of the bearing by an oil pump (not shown), i.e. the oil which is ejected from the center groove 4 of the bearing into the largest chamfer of the land lying next to the center groove then seeks to penetrate into the smaller chamfer of the next land. In this manner, that portion of the oil jet which is larger than the smallest chamfer in the land lying beside it impinges upon the outside flank of this groove and fills the groove with oil. This lubricant flow process is repeated according to the number of grooves, so that before the oil can escape laterally through the bearing clearance gap, it must first fill up all the grooves 1 and 4.

Figure 10:
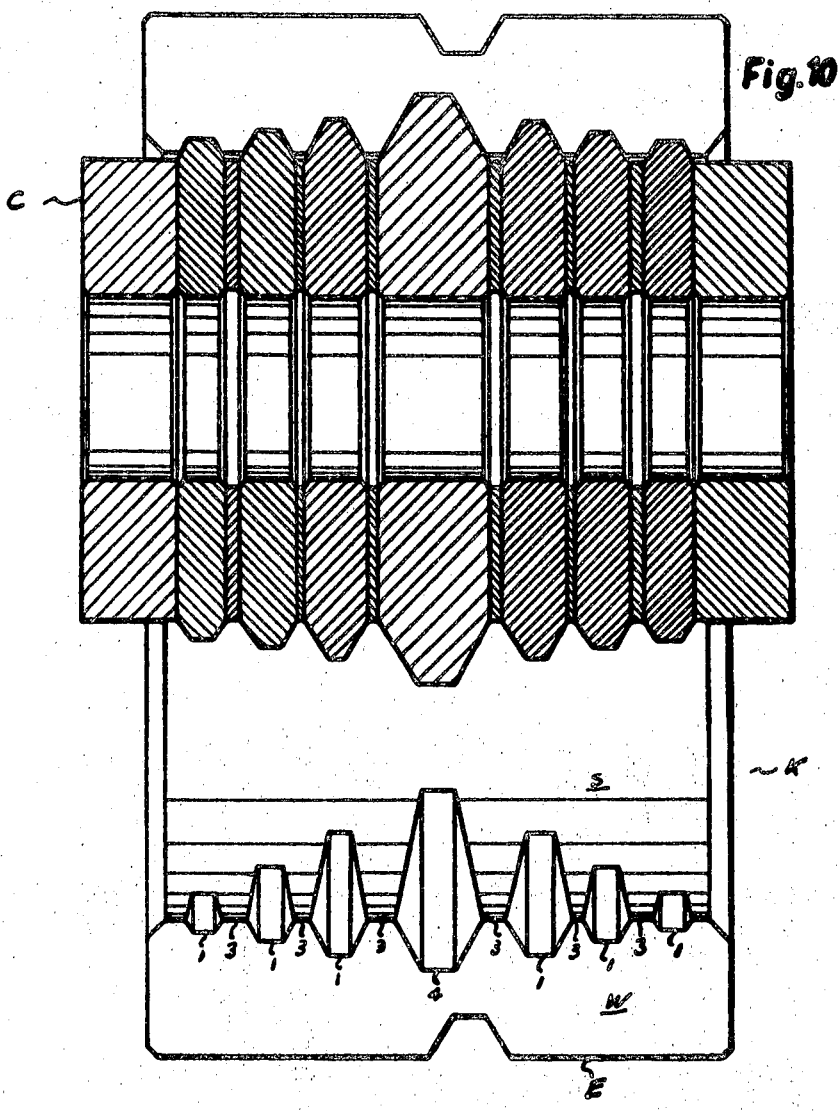
FIG. 10 is a schematic view, partly in section, of a bearing, similar to that shown in FIG. 2, and a typical milling cutter that can be used for machining lubricant grooves in such a bearing.
Figure 11:
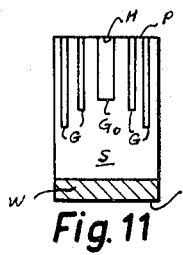
FIG. 11 is a side view, partly in section, of a bearing shell segment of a split bearing for supporting a rotatable journal shaft, as viewed in a direction parallel to one of the parting surfaces of said bearing shell segment, and illustrating one particular lubricant groove arrangement in accordance with the invention.
Figure 12:
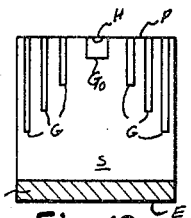
FIG. 12 is a side view, partly in section, of a bearing shell similar to that in FIG. 11, and illustrating another lubricant groove arrangement in accordance with the invention.
Figure 13:
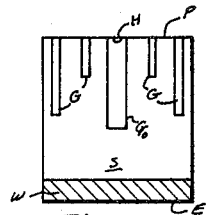
FIG. 13 is a side view, partly in section, of a bearing shell segment similar to that in FIG. 11, and illustrating another lubricant groove arrangement in accordance with the invention.
Figure 14:
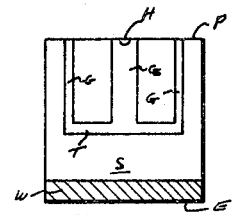
FIG. 14 is a side view, partly in section, of a bearing shell segment similar to that in FIG. 11, and illustrating still another lubricant groove arrangement in accordance with the invention.
Figure 15:
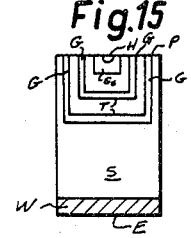
FIG. 15 is a side view, partly in section, of a bearing shell segment similar to that in FIG. 11, and illustrating another and further lubricant groove arrangement in accordance with the invention.
Figure 16:
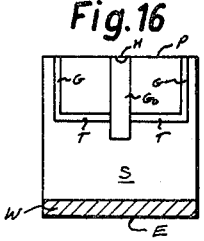
FIG. 16 is a side view, partly in section, of a bearing shell segment similar to that in FIG. 11, and illustrating a further lubricant groove arrangement in accordance with the invention.
Figure 17:
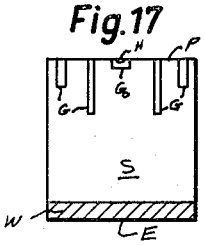
FIG. 17 is a side view, partly in section, of a bearing shell segment similar to that in FIG. 11, and illustrating a further lubricant groove arrangement in accordance with the invention.
Figure 18:
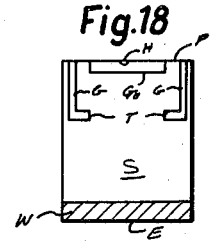
FIG. 18 is a side view, partly in section, of a bearing shell segment similar to that in FIG. 11, and illustrating still another and further lubricant groove arrangement in accordance with the invention.
Figure 19:
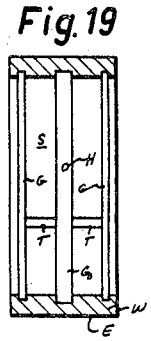
FIG. 19 is a side view, partly in section, of a bearing for supporting a rotatable journal shaft, and illustrating a lubricant groove arrangement in accordance with the invention.

In the case of bushed bearings, it is advantageous to flatten down to various extents the lands located between the various adjacent groups, such as for example by using a rotary milling cutter C illustrated schematically in FIG. 10. With such a machining arrangement, the milling of the individual grooves 1 and 4 and the flattened portions 3 can be thus performed in a single operation.

By these measures, provision is made according to the invention for the necessary rate of lubricant flow and for a reliable build up of an oil film on the bearing surface in the case of bearings used in engines which are cold started. The invention of course provides for making the edge chamfers in the lands larger in the outer areas of the bearing, and accordingly for making these chamfers smaller towards the middle of the bearing. This has an especially favorable effect on the performance of the bearing when, for example, a direct connection of the outer grooves or pockets to the oil pump is created. A groove combination of this kind can be installed both in bearings of an oval or double oval cross-section and in bearings of cylindrical cross-section.

Figure 3:
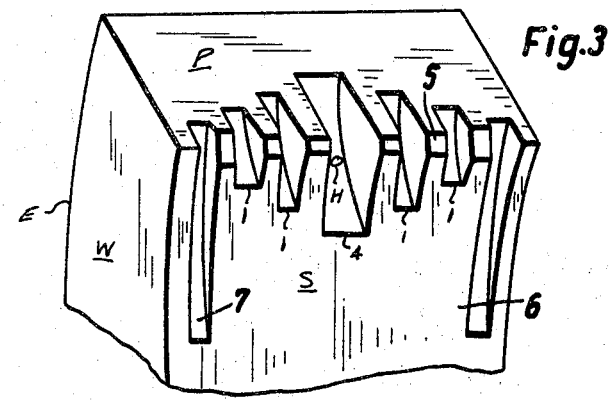
FIG. 3 is a perspective view of a portion of a bearing shell segment of a split bearing according to a further embodiment of the invention.

FIG. 3 shows a variation of the groove arrangement according to the invention as shown in FIG. 2. The size of the chamfers 5 in FIG. 3 increases towards the edge of the bearing. Furthermore, the two lateral grooves 6 and 7 are lengthened in the direction of the load-bearing area.

Figure 4:
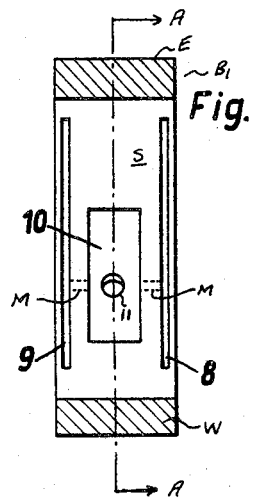
FIG. 4 is a side view, partly in section, of a bearing for supporting a rotatable journal shaft, constructed in accordance with another embodiment of the invention.

In the bearing B of FIG. 4, the two longitudinal grooves 8 and 9 extending laterally on the margin of the bearing B are arranged in combination with a pocket 10. The oil pocket 10 is connected by a passage 11, for example, to an oil pump (not shown).

Figure 5:
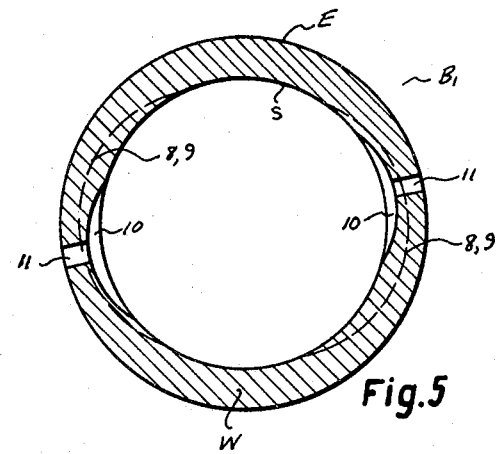
FIG. 5 is a sectional view of the bearing of FIG. 4 taken along the line A—A.

FIG. 5 shows the arrangement of the grooves 8 and 9 and the oil pocket 10 and passage hole 11 of the bearing $B_1$ shown in FIG. 4.

Figure 6:
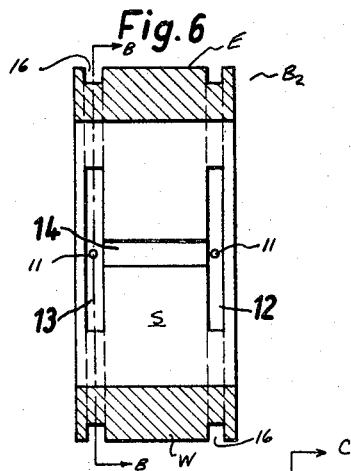
FIG. 6 is a side view, partly in section, of a bearing for supporting a rotatable journal shaft, constructed in accordance with a further embodiment of the invention.
Figure 7:
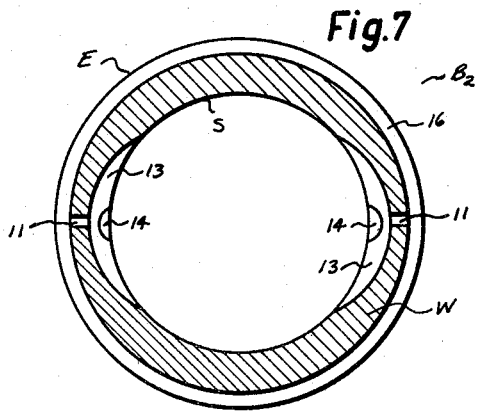
FIG. 7 is a sectional view of the bearing of FIG. 6 taken along the line B—B therein.

The bearing $B_2$ illustrated in FIGS. 6 and 7 differs from the preceding one in that the two lateral grooves 12 and 13 are connected crosswise by an axial groove 14.

Figure 8:
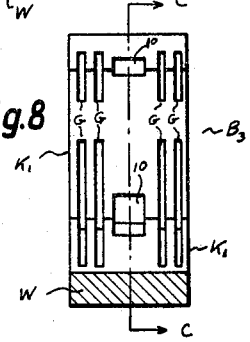
FIG. 8 is a side view, partly in section, of a bearing for supporting a rotatable journal shaft, constructed in accordance with a further embodiment of the invention.
Figure 9:
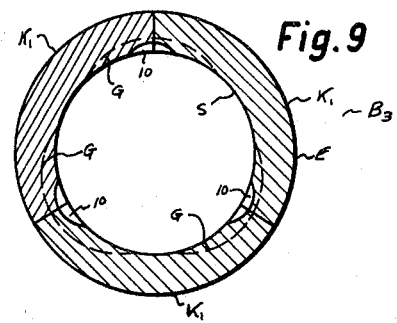
FIG. 9 is a sectional view of the bearing of FIG. 8 taken along the line C—C therein.

FIGS. 8 and 9 show a bearing $B_3$ with a three segment sleeve-like shell W, in which the groove G systems according to the invention are combined with a pocket 10 in each case, in order to prevent the escape of lubricant at the marginal joints where this problem is particularly severe.

FIGS. 11 to 26 show a variety of lubricant groove G, $G_0$, $G_1$ and connecting passage T arrangements possible within the framework of the invention that can be used to meet the requirements of specific bearing applications.

In general, the groove and pocket arrangements shown in FIGS. 11–26 relate to bearings which are used for supporting rotatable journal shafts and in which one set of grooves extends longitudinally along the inside circumference of the bearing shell surface so as to be disposed parallel to the path of relative movement between said surface and the journal shaft, and wherein additional grooves recessed into the bearing surface, and disposed parallel to the axis of rotation of the journal shaft are provided for flow connecting the circumferential grooves to each other so that all grooves are supplied with lubricant.

Figure 20:
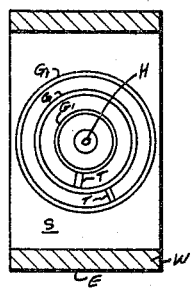
FIG. 20 is a side view, partly in section, of a bearing similar to that shown in FIG. 19, and illustrating another lubricant groove arrangement according to the invention.
Figure 21:
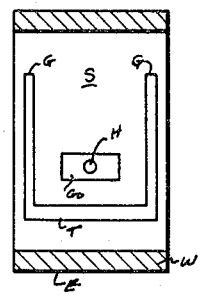
FIG. 21 is a side view, partly in section, of a bearing similar to that shown in FIG. 19, and illustrating another lubricant groove arrangement according to the invention.
Figure 22:
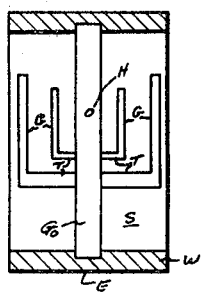
FIG. 22 is a side view, partly in section, of a bearing similar to that shown in FIG. 19, and illustrating a further lubricant groove arrangement according to the invention.

To achieve the advantageous lubricating results of the invention, it is not necessary that the entire length of the lubricant groves G be disposed parallel to the path of relative movement between the bearing and the journal shaft, but it is sufficient if a portion of the length along each lubricant groove is disposed parallel to the direction of relative movement. For example, as shown in FIG. 20, wherein the lubricant grooves $G_1$ are disposed in the bearing surface S in the form of concentric rings, such an arrangement provides grooves which have both portions parallel to the direction of relative movement, and transverse to said direction of relative movement. Those portions of the ring grooves $G_1$ in FIG. 20 which are disposed parallel to the direction of relative movement can serve as sealing means to prevent the escape of lubricant from the bearing, and those portions of the ring grooves which are disposed transversely to the direction of relative motion can serve in the same manner as the axially disposed connecting grooves T.

Figure 27:
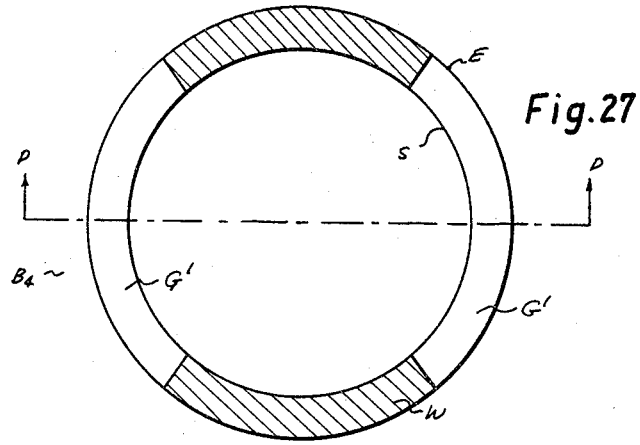
FIG. 27 is an end view, partly in section, of a bearing for supporting a rotatable journal shaft, and illustrating a lubricant groove construction according to a further embodiment of the invention wherein the grooves are extended in depth completely through the bearing shell in the manner of slots.
Figure 28:
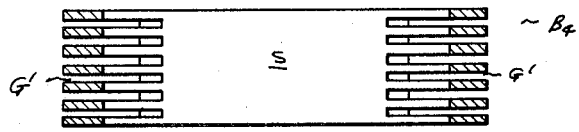
FIG. 28 is a sectional view of the bearing shown in FIG. 27, taken along the line D—D therein.
Figure 28A:
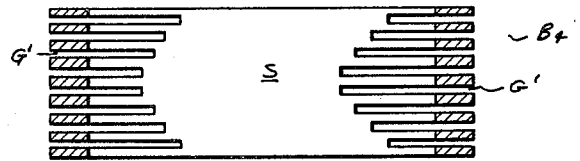
FIG. 28a is another sectional view, similar to that of FIG. 28 showing a somewhat modified lubricant groove arrangement.

FIGS. 27, 28 and 28a show examples of bearing $B_4$ in which the groove G' arrangements of the invention, wherein the grooves G' extend all the way through the bearing shell W, simultaneously render the bearing elastic. Thus, in these embodiments of the invention, the lubricant grooves extend in depth completely through the bearing shell in the manner of slots, which can be varied in length as is shown for example in FIG. 28a.

Figure 29:
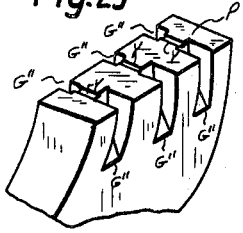
FIG. 29 is a perspective view of a portion of a bearing shell section for an axial thrust bearing which is provided with lubricant grooves and passages in accordance with the invention.

FIG. 29 is a section of a bearing shell of an axial thrust bearing $B_5$, in which grooves G" are provided on both sides in the area of the parting surface P, each groove G" on one side being connected to a corresponding groove on the other by flow passages Y.

Figure 30:
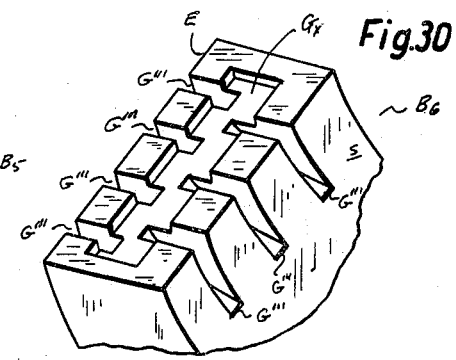
FIG. 30 is a perspective view of a portion of a bearing shell section similar to that shown in FIG. 29, but provided with a different lubricant groove and passage arrangement in accordance with the invention.

FIG. 30 shows a partial perspective view of a bearing shell $B_6$ which is provided with grooves G''' both on the outside surface E of the bearing shell and in the inside or bearing bore surface S. All of these grooves are connected to one another by means of a recessed groove $G_x$ disposed in the parting surface. If desired, a screen or filter can be inserted into this connecting groove $G_x$, so as to maintain the bearing free from dirt particles.

In the embodiments represented by FIGS. 31 and 32, the connecting grooves $G_x$ are also provided in the parting surfaces P of the bearing shells $B_7$, while the connection in the case of the bearing $B_8$ in FIG. 33 between the grooves $G_y$, is produced by chamfering the outside surface edge Y of the bearing shell.

As can readily be noted from FIGS. 1–34, the lubricated bearing of the instant invention, in its multiplicity of embodiments is designed for journally supporting an element movable in relation to its bearing surface S along a given path. In the case of the bearings shown in FIGS. 1–28a and in FIGS. 31–34, which are particularly adapted for supporting a rotatable shaft, this path of relative motion is that defined by a cylinder rotating about its longitudinal axis relative to a surrounding cylindrical sleeve, the cylinder corresponding to the journal shaft, and the sleeve corresponding to the bearing. Hence in the case of such sleeve bearings, the bearing surface S is both parallel, in the sense of being a concentric circular (or approximately circular) cylindrical surface, with the bearing contact surface, i.e. the exterior surface of the shaft, as well as being parrallel to the path of relative motion occurring during the axial rotation of said shaft. (For purposes of simplification, the shaft is not shown except in FIG. 34.)

The bearing shell wall W is provided with a plurality of grooves, i.e. the grooves 1, 4, 6, 7, 8, 9, 12, 13 and G, which are open at the bearing surface S to distribute lubricant thereover and thereby form a lubricant film between said surface S and the movable journal shaft so as to support said shaft upon said lubricant film in relation to said surface S and to reduce the friction opposing the relative movement therebetween.

The lubricant is normally supplied through the external surface E of the bearing shell wall W to one or more grooves directly, or to a selected groove 4 by means of a passage such as the hole H, as illustrated in FIGS. 2 and 3. In the case of the bearing shown in FIGS. 2 and 3, lubricant from the groove 4 passes to the other grooves 1 by means of the transverse flow path created by chamfers 3 in the case of FIG. 2 and the chamfers 5 in the case of FIG. 3, since a similar but opposite hand bearing segment (not shown) is joined at the parting surface P of the bearing segment K, with its associated parting surface (not shown) in contiguous abutting contact therewith when the complete bearing is assembled.

As can be noted from FIGS. 1–9, the grooves 1, 4, 6, 7, 8, 9, 10, 12, 13 and G are disposed preferably parallel to the path of relative movement between the journal shaft and the bearing surface S. However, it is not absolutely necessary that said grooves be completely parallel throughout their entire length to said path of relative movement, and it is sufficient if they have lengthwise portions which are parallel to said relative motion path, such as for example the ring grooves $G_1$ in FIG. 20, which are actually in the shape of the intersection contours of circular cylinders which intersect the cylindrical bearing surface S at right angles to its longitudinal axis.

While various means for supplying lubricant to the grooves in the bearing surface S can be used as will be appreciated by the artisan, as can be seen from FIG. 2 as a typical example, means defining a first lubricant passage in the form of the hole H extending through the shell wall W, and connectable at the exterior surface E to a lubricant source (not shown) can be provided for supplying lubricant to the groove 4. Means defining a second flow passage in the form of the channel resulting from the chamfers 3 when the shell segment K is joined at its parting surface P to a similar but opposite hand mating segment, can be provided for supplying lubricant from the groove 4 to each of the remaining grooves for lubricant film forming distribution thereby.

If desired, as exemplified by FIG. 4, the lubricant can be supplied first to the pocket 10 via the hole passage 11, and from there to the grooves 8 and 9 by means of the passage defined by the clearance between the shaft (not shown) and the bearing surface S. In cases where a larger cross section flow path is desired between the pocket 10 and the grooves 8 and 9, additional grooves M, shown in phantom can be provided. For convenience in manufacturing, the various grooves 8, 9, M, etc. can be open at the surface S, so that they can be cut by a routing cutter (not shown).

In FIG. 10, a milling cutter C is shown as a typical means for simultaneously machining the grooves 1 and 4, and the chamfers 3 in the bearing shell segments K of FIG. 2.

In FIGS. 11–26, a variety of bearing lubrication groove arrangements are shown for purposes of example, and in FIGS. 11–22 the lubricant is supplied to at least one groove $G_0$ by means of a hole passage H communicating with the particular groove $G_0$ to be supplied, and lubricant is supplied to the other grooves G from said groove $G_0$ by transverse grooves T also open at the bearing surface S.

Figure 23:
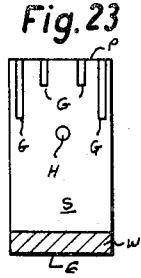
FIG. 23 is a side view, partly in section, of a bearing shell segment similar to those shown in FIGS. 11–18, and illustrating still another lubricant groove arrangement according to the invention.
Figure 24:
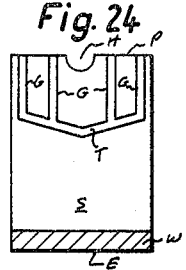
FIG. 24 is a side view, partly in section, of a bearing shell segment similar to that shown in FIG. 23, and illustrating a further lubricant groove arrangement according to the invention.
Figure 25:
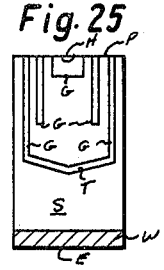
FIG. 25 is a side view, partly in section, of a bearing shell segment similar to that shown in FIG. 23, and illustrating a further lubricant groove arrangement according to the invention.

In FIGS. 23–25, it is shown that the lubricant feed hole H need not be directly communicating with any of the grooves by means of a transverse groove T, but can utilize the clearance space between the bearing surface S and the journal shaft for supplying lubricants to the grooves G. Also as indicated by FIGS. 24 and 25, the transverse groove T need not be perpendicular to grooves G, but can be inclined thereto at either acute or obtuse angles.

FIGS. 27, 28, and 28a exemplify an embodiment of the invention wherein the grooves G′ extend completely through the bearing shell wall, in the manner of slots, which are open on both the exterior surface E and the bearing surface S. Thus, by mounting the bearing so that its exterior surface E is operatively connected to a lubricant reservoir (not shown) at least in the area of the groove G′ openings, the interior surface S can be supplied with lubricant.

FIGS. 8 and 9 exemplify a bearing having three contiguously adjoining peripheral shell wall segments $K_1$, with adjacent segments $K_1$ having end opposing partition surfaces $P_1$ in contiguous abutting contact to define partition planes separating said adjacent segments $K_1$. Three sets of grooves $G_2$ are provided with the grooves $G_2$ in each set being intersected transversely by a partition claim, and disposed in lateral parallel spaced-apart relation to each other. Lubricant is supplied to the grooves $G_2$ via passages H extending through the shell wall W and operatively connected to a lubricant source (not shown), said passages H being in communication with centrally disposed pockets R which in turn supply the grooves $G_2$ with lubricant via the bearing surface S to journal shaft clearance passages. If desired, transverse grooves (not shown) can be provided extending along the partition planes for flow connecting each set of grooves $G_2$ to each other and to the pockets R disposed between them.

In FIGS. 6 and 7, a lubricant is supplied to the grooves 12, 13 and 14 via the passages 11 which communicate with annular grooves 16 recessed into the exterior surface E of the bearing shell wall W. These annular grooves 16 can be supplied with lubricant via the bearing block (not shown) which supports the shell wall W.

As can be seen from FIG. 34, the journal shaft 101 can be provided with grooves 102 recessed into its bearing contact surface S′ which cooperates with the laterally disposed bearing surface grooves G and the central bearing groove $G_0$ to supply lubricant therefrom to the grooves G, said groove $G_0$ being supplied with lubricant via the passage H.

While two sets of grooves $G_0$, G and 102 are shown disposed 180 degrees apart in FIG. 34, any other suitable number and angular arrangement of said groove sets can be provided.

As will be appreciated by the artisan, the physical arrangement of the grooves G, $G_0$ and 102 in FIG. 34 can be transposed in the manner of a mirror image inversion such that annular grooves corresponding to the grooves G and $G_0$ are disposed on the shaft 101 and recessed into its surface S′ and the transverse groove 102 is disposed on the bearing wall W, and recessed into its surface S.

What is claimed is:

1. An anti-friction bearing having a bearing surface for journally supporting a rotating element therein and composed of at least two shells wherein each of said shells have comb-like grooves at the meeting faces of said shells extending partially along the bearing surface and at least partially along the meeting faces of said shells and wherein the intersection between said meeting face and said bearing surface of each shell is chamfered to a variable depth along the intersection of the meeting faces and bearing surfaces.

2. An anti-friction bearing as claimed in claim 1, wherein said chamfer has its greatest depth in the central portion of said intersection.

3. An anti-friction bearing as claimed in claim 1, wherein the extremities of said intersection are unchamfered.

4. An anti-friction bearing as claimed in claim 3, wherein said chamfer increases in depth from the central portion toward the extremities of said intersection.

5. An anti-friction bearing as claimed in claim 1, wherein said grooves have different depths.

6. An anti-friction bearing having a bearing surface for journally supporting a rotating element therein and composed of at least two half shells, wherein said shells have comb-like grooves at the meeting faces of said shells extending partially along the bearing surface and through each shell and across the entire meeting face, whereby lubricant may be supplied through said grooves.

7. An anti-friction bearing as claimed in claim 6, wherein said grooves have different depths.

8. An anti-friction bearing as claimed in claim 6, wherein the intersection between said meeting face and said bearing face is chamfered along the intersection of the meeting faces and bearing surfaces.

9. An anti-friction bearing as claimed in claim 1, having means disposed through each of said shells to operatively connect said grooves to a lubricant source.

10. An anti-friction bearing for journally supporting an element movable in relation thereto along a given path, which comprises a shell wall having a surface disposed in adjacent parallel relation to the movable element to be supported, said surface being also disposed in parallel relation to the path of movement of said element, said shell wall having a plurality of recessed grooves disposed in parallel relation to the path of relative movement between said movable element and the surface of said shell wall and in parallel spaced-apart relation to each other, and including a first flow passage adapted to be connected to a lubricant source and extending through said shell wall, and in communication with a first groove centrally disposed laterally with respect to the remaining grooves; a second flow passage in communication with said first groove and each other groove disposed laterally to both sides of said first groove, which second passage continuously decreases in cross-section with increasing lateral extension distance from said first groove, whereby lubricant supplied through said first flow passage to said first groove is supplied therefrom by said second passage to the remaining grooves disposed laterally to each side of said first groove for distribution by said first and remaining grooves to form a lubricant film.

References Cited

UNITED STATES PATENTS

| | | | |
|---|---|---|---|
| 639,250 | 12/1899 | Knapp | 308—240 |
| 714,114 | 11/1902 | Sceets | 308—240 |
| 2,004,254 | 6/1935 | Taub | 308—240 |
| 2,421,668 | 6/1947 | Ware | 308—240 |
| 2,631,905 | 3/1953 | Coppen | 308—240 |
| 2,901,297 | 8/1959 | Sternlicht | 308—240 X |
| 2,955,003 | 10/1960 | Sheppard | 308—77 X |
| 563,134 | 6/1896 | Cambell | 308—162 |
| 1,775,496 | 9/1930 | Moe | 308—162 |
| 1,900,593 | 3/1933 | Wade | 308—122 |

FOREIGN PATENTS

| | | |
|---|---|---|
| 800,533 | 5/1936 | France. |
| 795,647 | 5/1958 | Great Britain. |
| 824,204 | 11/1959 | Great Britain. |
| 869,358 | 5/1961 | Great Britain. |
| 466,342 | 7/1949 | Italy. |

MARTIN P. SCHWADRON, *Primary Examiner.*

FRANK SUSKO, *Examiner.*

R. F. HESS, *Assistant Examiner.*